United States Patent [19]

Bittner

[11] Patent Number: 5,126,074

[45] Date of Patent: Jun. 30, 1992

[54] ANTI CORROSIVE PIGMENTS BASED ON ALKALINE EARTH HYDROGEN PHOSPHATES

[75] Inventor: Annegret Bittner, Langelsheim, Fed. Rep. of Germany

[73] Assignee: Dr. Hans Heubach GmbH & Co. KG, Fed. Rep. of Germany

[21] Appl. No.: 734,089

[22] PCT Filed: Sep. 21, 1988

[86] PCT No.: PCT/EP88/00855

§ 371 Date: Jun. 8, 1988

§ 102(e) Date: Jun. 8, 1988

[87] PCT Pub. No.: WO89/02454

PCT Pub. Date: Mar. 23, 1989

Related U.S. Application Data

[63] Continuation of Ser. No. 359,742, Jun. 8, 1989, abandoned.

[30] Foreign Application Priority Data

Sep. 21, 1987 [DE] Fed. Rep. of Germany ....... 3731737

[51] Int. Cl.$^5$ .............................................. C23F 11/18
[52] U.S. Cl. .................................. 252/387; 106/14.34; 252/389.23; 252/389.3; 252/389.4; 252/389.61; 252/389.62
[58] Field of Search ............. 252/389.23, 389.3, 389.4, 252/389.62, 389.61, 387; 106/14.34

[56] References Cited

U.S. PATENT DOCUMENTS 4,294,621 10/1981 Maurer et al. ...................... 106/306
4,347,285 8/1982 Batdorf ............................... 428/332

FOREIGN PATENT DOCUMENTS 1117705 2/1982 Canada .

OTHER PUBLICATIONS

Chemical Abstracts, vol. 90, 1979, p. 25591, Abstract No. 25594t, Matsushima, Hisao, "Calcium Hydrogen Phosphates-Calcium Carbonate Composite".

Primary Examiner—Deborah L. Kyle
Assistant Examiner—Valerie D. Fee
Attorney, Agent, or Firm—Venable, Baetjer, Howard & Civiletti

[57] ABSTRACT

The invention shows anticorrosive pigments on the basis of alkaline earth hydrogen phosphates, which are distinguished in that they contain from 20 mole-% to 60 mole-% of alkaline earth carbonate, the balance being alkaline earth hydrogen phosphate of the particular like alkaline earth metal, as well as a process of producing them in that alkaline earth carbonate and phosphoric acid are in per se known manner reacted with one another at the desired molar ratio, as well as the use of the anticorrosive pigments for corrosion protection of aluminum substrates, particularly for preventing filiform corrosion in aircraft coatings.

3 Claims, No Drawings

ANTI CORROSIVE PIGMENTS BASED ON ALKALINE EARTH HYDROGEN PHOSPHATES

This application is a continuation of application Ser. No. 07/359,742, filed Jun. 8, 1989 now abandoned.

Strontium chromate-containing primers are of great significance in practice in the aircraft industry in conjunction with the production of coatings serving for the protection of metals, in particular of pre-treated aluminum alloys. The best coating systems for passenger aircraft have for quite some time been made to consist of a chemical conversion layer, viz. a chromate-, phosphate-protective layer, which is produced on Al-surfaces by the dipping, wipe-on, spraying or roller application processes as anticorrosive, and which is known e.g. under the designation Alodine 1200, or of an acid wash primer, and thereafter an epoxyamine or polyamide-corrosion protection coating or a polyurethane (PUR) corrosion protection layer with a high-gloss aliphatic PUR-topcoat. By using strontium chromate in the corrosion protection coating filiform corrosion is prevented. Filiform corrosion is observed only on pre-treated substrates, such as Fe, Zn, Mg, steel, Ni, Cr and, in particular, Al. A (star-shaped) loss in adhesion going out from a damaged location in the lacquer film occurs—referably at values of humidity of air of from 65-95% and temperatures of approximately 30° C.—between the chemically pre-treated substrate and the coating, which results in the coating chipping off.

There is, for instance, also known from DE-PS 74 77 80 a group of anticorrosive pigments, in the case of which a compound mixture, which contains as the cation at least two of the metals calcium, strontium, barium, magnesium, zinc and as the anion chromate ion and yet at least one anion selected from the carbonic, phosphoric, silicic, hydrofluoric or boric acids, is deposited onto inactive fillers. In that way, a chromate always is present, with best results likewise being obtained with strontium chromate.

However, strontium chromate belongs to the anticorrosive pigments which, as zinc chromate, are hazardous from the physiologic standpoint on account of their cancerogenic activity and should, if possible, no longer be utilized.

It has been attempted to use, by way of substitutes, zinc phosphate and modified zinc phosphates, such as shown in EU-A no. 0054266 and 0054267, which are for environmental protection reasons being employed increasingly in lieu of zinc chromate. These zinc phosphates do not, however, lead to any change in regard to filiform corrosion. Strontium hydrogen phosphates have also been tested, but they did not provide the protective effect which may be determined in the case of strontium chromate.

EU-PS 0011223 shows a corrosion inhibiting pigment and a paint on the basis of phosphate, consisting of a mixture of from 3 to 97% by wt. of $MgHPO_4 \cdot 3H_2O$, the balance being $CaHPO_4 \cdot 2H_2O$. The pigment is especially suited for the protection of iron and iron alloys and may be applied as a paint or a paste. The pigment may be exchanged up to 95% by wt. by pigment extenders, for instance barytas, talc, alkaline earth carbonates or wollastonite, and the pigment is to be present in the dried protective layer in a pigment volume concentration of from 10 to 60% by volume.

These combination-type pigments of magnesium and calcium hydrogen phosphate are, however, not very well suited for aluminum or mixed substrates, which do not consist exclusively of iron and iron alloys.

There still exists, therefore, a need for an anticorrosive coating for metals, in particular aluminum, which is non-toxic and yet comparable with the known strontium chromate as concerns its resistance to filiform corrosion.

It has now been found that carbonate-containing alkaline earth hydrogen phosphates, in particular magnesium and strontium hydrogen phosphates, exhibit better stability values to filiform corrosion than other metal phosphates, also than, in particular, magnesium hydrogen phosphate and strontium hydrogen phosphate without any carbonate component of the same alkaline earth metal. The complex effect of these carbonate-containing alkaline earth phosphates is yet further improved by additions of fluorosilicates and/or fluoroborates and/or alkali or alkaline earth fluorides, respectively. In that respect, heavy metals, but also groups II and III of the periodic table, hence alkaline earth metals and earth metals, and here especially Al, come into consideration as the metal proportion of the fluorosilicates and fluoroborates.

At least 40 mole-% of alkaline earth carbonate in the complex are required so as to provide for adequate anticorrosive action; 50 mole-% of alkaline earth carbonate, with the balance being alkaline earth hydrogen phosphate, are still better. There should not be exceeded a carbonate proportion of 80%.

The additions of fluorosilicates or fluoroborates and/or alkali or alkaline earth fluorides, respectively, are comparatively low and amount to about 0.05 to 3%, in particular to 0.1 to 1%, an amount of from 0.1 to 0.5% frequently providing very good results. A few routine tests may serve to try and find out what is the right thing in regard to this as well as also in regard to the ratio between alkaline earth hydrogen phosphate and alkaline earth carbonate.

The following Examples will elucidate the invention.

PRODUCTION EXAMPLE

By the reaction of magnesium carbonate in an aqueous, 10-40% suspension with technical phosphoric acid at a molar ratio of 2:1 there is obtained magnesium hydrogen phosphate with a carbonate proportion of 50 mole-%. The reaction may be carried out at temperatures between room temperature and heat of boiling of the mixture, but it is carried out preferably, in the case of an amount of a few kilograms, at temperatures of from 30° to 50° C. for a period of time of 30 minutes, with the period of time, but also the temperature, depending upon the converted amount. In the case of a production charge of about 5 t, for instance, the temperature increases on account of the resultant heat of reaction to about 90° C., and the reaction lasts for about 3 hours. Hence, the duration of the reaction and the reaction temperature are the longer and higher, the larger the amount used is. The increase in temperature also has the advantageous effect that the time of reaction can be kept within reasonable limits. The precipitated pigments are filtered off in customary manner, manner, are dried at 105° C. and ground.

Mixed pigments of strontium carbonate with phosphoric acid were produced in the same manner.

By varying the proportions of carbonate and phosphoric acid there were produced mixed pigments with 0.7 mol strontium hydrogen phosphate and 0.3 mol strontium carbonate and 0.4 mol strontium hydrogen phosphate and 0.6 mol strontium carbonate.

To this last-mentioned pigment there were still added in one instance 0.3% lead fluoroborate, in one instance 0.3% copper fluorosilicate, in one intance 0.1% potassium fluoride and in one instance 0.3% magnesium fluorosilicate.

These pigments, which are designated as pigments 1 to 5, were compared, according to the Table shown below, in lacquer coating compositions of the kind customarily used in regard to the coating of aircraft, with strontium chromate, zinc phosphate, magnesium hydrogen phosphate, strontium hydrogen phosphate in that they were applied as customary epoxy-polyamide-based 2-K-coating for aircraft onto aluminum sheets and then tested.

TEST

The mentioned anticorrosive pigments were tested by comparison with strontium chromate and zinc phosphate in the base coats of coating build-ups on aluminum substrates.
1. 1000 hours salt spray test DIN 50021
2. 24 hours storage in water at room temperature
3. 500 hours storage at 85% rel. humidity of the air and 25° C., previous one-hour initiation of the scratched metal sheets in conc. HCl-vapor.

COATING SYSTEM

| Substrate: | AL 2024 (ASTM D 1733-65) QQ-A-250/4, T 3 temper |
| --- | --- |
| Conversion layer: | Yellow chromating (Alodine 1200) |
| Base coating: | Epoxide-polyamide resin base (for formulations, see Table 2) Dry layer thickness 20 microns |
| Top coating: | Polyurethane resin base Dry layer thickness 45 microns. |

RESULT

On salt spray testing in the case of water-storage, results were obtained with the carbonate-containing anticorrosive pigments, which results may be said to be comparable in quality to the results obtained with strontium chromate.

The most important criterion in regard to the evaluation of the new anticorrosive pigments is the test concerning filiform resistance. Evaluation in that respect takes place by the measurement of the average infiltration in millimeters at the section.

The test results in regard to filiform resistance are shown in Table 1 below.

TABLE 1

Comparison of filiform corrosion in millimeters after storage for 500 hours at 85% rel. humidity and 25° C.

| | Addition | mm |
| --- | --- | --- |
| Strontium chromate | | 1 |
| Zinc phosphate | | 6 |
| [MgHPO$_4$].xH$_2$O (Pigment 1) | | 4 |
| [0.5 MgHPO$_4$.0.5 MgCO$_3$].xH$_2$O (Pigment 2) | | 2–3 |
| [SrHPO$_4$].xH$_2$O (Pigment 3) | | 4 |
| [0.7 SrHPO$_4$.0.3 SrCO$_3$].xH$_2$O (Pigment 4) | | 2–3 |
| [0.4 SrHPO$_4$.0.6 SrCO$_3$].xH$_2$O | | 2–3 |
| [0.4 SrHPO$_4$.0.6 SrCO$_3$].xH$_2$O (Pigment 5) | 0.3% Pb(BF$_4$)$_2$ | 2 |
| [0.4 SrHPO$_4$.0.6 SrCO$_3$].xH$_2$O | 0.3% CuSiF$_6$ | 2 |
| [0.4 SrHPO$_4$.0.6 SrCO$_3$].xH$_2$O | 0.1% KF | 2 |
| [0.4 SrHPO$_4$.0.6 SrCO$_3$].xH$_2$O | 0.3% MgSiF$_6$ | 2 |

TABLE 2

| 2-K-Coatings on epoxy-polyamide basis for aircraft | | | | | | | |
| --- | --- | --- | --- | --- | --- | --- | --- |
| Type 1 | 1 | 2 | 3 | 4 | 5 | 6 | 7 |
| Component A | | | | | | | |
| Epoxide resin, 75%, in toluene (molecular wt.: 900, EP-equivalent wt. 2000–2200) | 21.6 | 20.4 | 22.3 | 21.8 | 21.8 | 20.9 | 20.9 |
| n-butyl acetate | 1.8 | 1.7 | 1.8 | 1.8 | 1.8 | 1.8 | 1.8 |
| methyl ethyl ketone | 1.8 | 1.7 | 1.9 | 1.8 | 1.8 | 1.7 | 1.7 |
| Anti-settling agent | 1.1 | 1.0 | 1.2 | 1.1 | 1.1 | 1.0 | 1.0 |
| n-butyl acetate | 5.7 | 5.6 | 5.8 | 5.8 | 5.8 | 5.5 | 5.5 |
| methyl ethyl ketone | 5.6 | 5.6 | 5.8 | 5.8 | 5.8 | 5.5 | 5.5 |
| strontium chromate | 11.6 | — | — | — | — | — | — |
| zinc phosphate | — | 13.0 | — | — | — | — | — |
| Pigment 1 | — | — | 11.1 | — | — | — | — |
| Pigment 2 | — | — | — | 11.4 | — | — | — |
| Pigment 3 | — | — | — | — | 11.4 | — | — |
| Pigment 4 | — | — | — | — | — | 12.7 | — |
| Pigment 5 | — | — | — | — | — | — | 12.7 |
| Rutil-titanium dioxide | 2.3 | 2.4 | 2.1 | 2.2 | 2.2 | 2.4 | 2.4 |
| Kieselguhr | 2.9 | 2.8 | 2.7 | 2.7 | 2.7 | 2.9 | 2.9 |
| Magnesium silicate | 5.6 | 5.8 | 5.3 | 5.5 | 5.5 | 5.6 | 5.6 |
| Component B | | | | | | | |
| Polyamide-curing agent, 70%, in xylene (H-equivalent wt. 240) | 11.5 | 10.9 | 12.0 | 11.6 | 11.6 | 12.6 | 12.6 |
| Ethylene glycol | 15.5 | 16.1 | 15.0 | 15.5 | 15.5 | 14.4 | 14.4 |
| Toluene | 6.5 | 6.5 | 6.5 | 6.5 | 6.5 | 6.5 | 6.5 |
| Methyl ethyl ketone | 6.5 | 6.5 | 6.5 | 6.5 | 6.5 | 6.5 | 6.5 |
| | 100.0 | 100.0 | 100.0 | 100.0 | 100.0 | 100.0 | 100.0 |
| PVK in % | 24.5 | 26.0 | 23.0 | 24.0 | 24.0 | 23.5 | 23.5 |

Components A and B are, before processing, mixed according to volume 1:1.

I claim:

1. An anticorrosive alkaline earth hydrogen phosphate based pigment comprising from 20 mole-% to 60 mole-% alkaline earth carbonate and from 40 to 80 mole -% of alkaline earth hydrogen phosphate of the same alkaline earth metal and an additive selected from the group consisting of fluorosilicates, fluoroborates, alkali or alkaline earth fluorides and combinations thereof, wherein said additive is present in an amount of 0.05% to 3% by weight.

2. The anticorrosive pigment of claim 1 wherein said additive is present in an amount between about 0.1 and 1 percent by weight based on the total weight of pigment.

3. The anticorrosive pigment of claim 2 wherein said additive is present in an amount between about 0.1 and 0.5 percent by weight based on the total weight of pigment.

* * * * *